United States Patent
Rees et al.

(10) Patent No.: US 8,327,458 B2
(45) Date of Patent: Dec. 4, 2012

(54) PROVIDING AN ACCESS MECHANISM ASSOCIATED WITH A DOCUMENT PART TO DETERMINE AN ACTION TO TAKE IF CONTENT OF THE DOCUMENT PART IS INACCESSIBLE

(75) Inventors: Robert Thomas Owen Rees, Newport (GB); Helen Balinsky, Cardiff Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 12/537,493

(22) Filed: Aug. 7, 2009

(65) Prior Publication Data

US 2011/0035811 A1 Feb. 10, 2011

(51) Int. Cl.
*G06F 17/00* (2006.01)
(52) U.S. Cl. .................. 726/27; 726/1; 726/26
(58) Field of Classification Search ............... 1/1, 26–30
See application file for complete search history.

(56) References Cited

U.S. PATENT DOCUMENTS

| | | | |
|---|---|---|---|
| 6,476,833 B1 * | 11/2002 | Moshfeghi | 715/854 |
| 6,567,107 B1 * | 5/2003 | Stannard | 715/764 |
| 7,254,772 B2 * | 8/2007 | Penke et al. | 715/273 |
| 7,380,120 B1 * | 5/2008 | Garcia | 713/160 |
| 7,392,533 B2 * | 6/2008 | Ternasky et al. | 726/2 |
| 7,921,284 B1 * | 4/2011 | Kinghorn et al. | 713/160 |
| 2002/0188862 A1 * | 12/2002 | Trethewey et al. | 713/201 |
| 2007/0101437 A1 * | 5/2007 | Yamamoto et al. | 726/27 |
| 2008/0005024 A1 * | 1/2008 | Kirkwood | 705/50 |
| 2008/0034205 A1 * | 2/2008 | Alain et al. | 713/160 |
| 2008/0066185 A1 * | 3/2008 | Lester et al. | 726/27 |
| 2008/0104493 A1 | 5/2008 | Rees | |
| 2008/0104497 A1 | 5/2008 | Lumley | |
| 2008/0104504 A1 | 5/2008 | Gimson | |
| 2008/0104508 A1 | 5/2008 | Lumley | |
| 2009/0046848 A1 * | 2/2009 | Booth | 380/28 |
| 2009/0254572 A1 * | 10/2009 | Redlich et al. | 707/10 |
| 2009/0319529 A1 * | 12/2009 | Bartlett et al. | 707/9 |
| 2010/0124355 A1 * | 5/2010 | Saito | 382/100 |

OTHER PUBLICATIONS

Bouganim et al., "Client-Based Access Control Management for XML documents", Preceedings of the 30th VLDB Conference, Toronto, Canada 2004.*
Lumley et al., U.S. Appl. No. 12/482,646 entitled "Updating Electronic Documents" filed Jun. 11, 2009, 21 pages.
Rees et al., U.S. Appl. No. 12/483,036 entitled "Rendering Definitions" filed Jun. 11, 2009, 25 pages.
Rees et al., U.S. Appl. No. 12/511,507 entitled "Sending a Subset of Component Documents of a Modular Document to an Electronic Device" filed Jul. 29, 2009, 20 pages.
Gimson et al., U.S. Appl. No. 12/511,500 entitled "Synchronizing a Change of a Modular Document" filed Jul. 29, 2009, 23 pages.
Rees et al., U.S. Appl. No. 12/511,513 entitled "Merging Instances of a Modular Document" filed Jul. 29, 2009, 24 pages.
Gimson et al., U.S. Appl. No. 12/511,523 entitled "Associating Version Information With a Component Document of a Modular Document" filed Jul. 29, 2009, 25 pages.

* cited by examiner

*Primary Examiner* — Peter Poltorak

(57) ABSTRACT

A modular document is composed of plural parts, where at least a particular one of the parts is associated with an access right policy that restricts access to the particular part. In response to a request to access the modular document, it is determined based on the access right policy whether content of the particular part is accessible in an electronic device. In response to determining that the content of the particular part is inaccessible in the electronic device, an access mechanism associated with the particular part is accessed to determine an action to take with respect to the particular part when presenting the modular document.

18 Claims, 5 Drawing Sheets

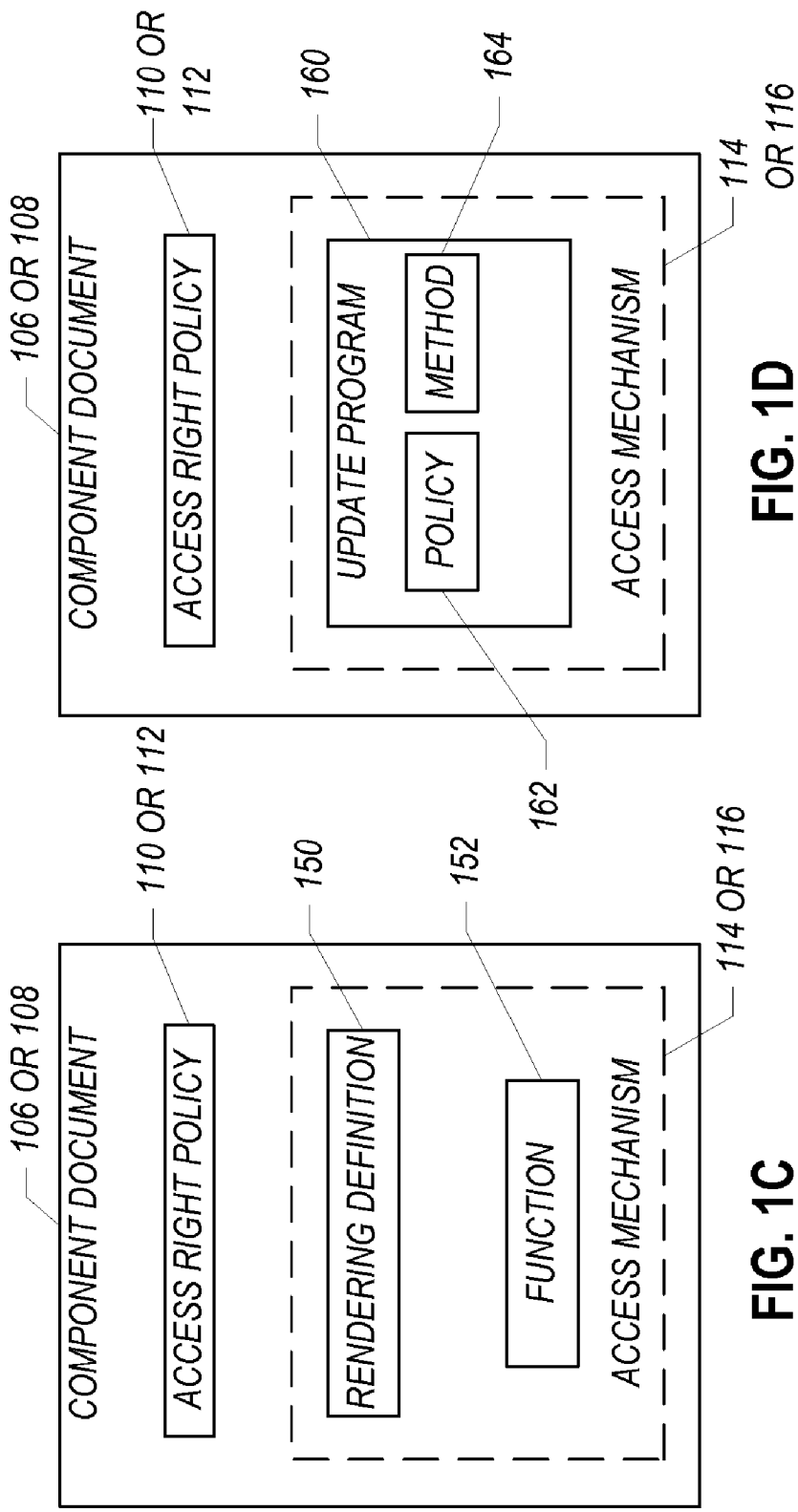

PROVIDING AN ACCESS MECHANISM ASSOCIATED WITH A DOCUMENT PART TO DETERMINE AN ACTION TO TAKE IF CONTENT OF THE DOCUMENT PART IS INACCESSIBLE

BACKGROUND

Electronic documents accessed using computers can include multiple parts. In some cases, access rights may be assigned not only to the entire electronic document but also to individual parts of the document. An access right defines any restrictions with respect to access (read or write) of the electronic document or a part of an electronic document. For example, the access right may specify that only certain categories of users or users having security levels greater than some threshold are allowed view the document or its part. As another example, an access right may specify that an electronic document or a part of the electronic document is not allowed to be modified.

Traditionally, when a user attempts to access an electronic document having parts associated with corresponding access rights, the device that receives the request may act just as a query modifier to cause fewer results to be returned (where the returned results exclude parts that the user does not have the right to access). However, such traditional mechanisms of handling access of documents with parts having respective access rights do not offer flexibility, and may produce results that are incomplete or unsatisfactory to users.

BRIEF DESCRIPTION OF THE DRAWINGS

Some embodiments of the invention are described with respect to the following figures:

FIGS. 1C-1D are schematic diagrams of component documents containing respective different types of access mechanisms, according to some embodiments;

DETAILED DESCRIPTION

Figure 1A:
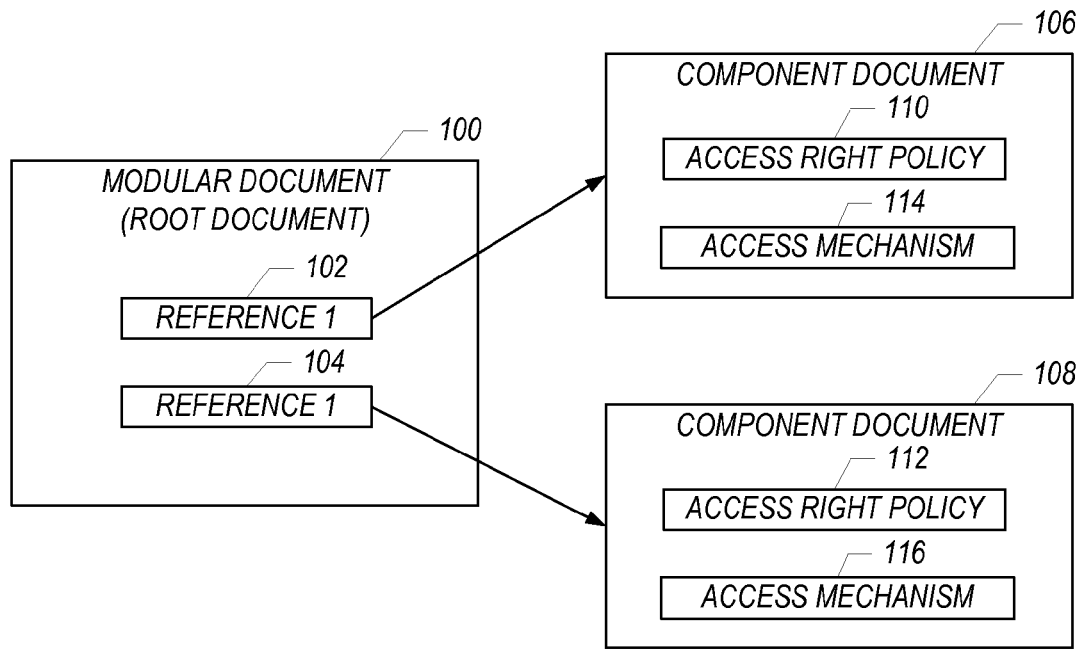
FIG. 1A is a schematic diagram of a modular document containing references to component documents that are associated with respective access rights and access mechanisms, according to an embodiment.

Documents can be in modular form to provide for enhanced flexibility and improved efficiency. A "modular document" refers to a document that is composed of separately identifiable component documents. A "document" refers to a container of data that is identifiable.

The component documents of a source document are combined to allow for proper presentation (e.g., viewing or listening) of the modular document. Combining the component documents also achieves a desired behavior of the modular document (e.g., load appropriate objects such as images or text, retrieve variable data from a selected source or sources, etc.). Some component documents can be shared by multiple modular documents, and any one of the component documents of a modular document can be modified or replaced. A modular document generally refers to any data structure container that has references to other documents that in combination make up the modular document.

Under certain scenarios, it may be desirable to share a modular document among multiple users. To enable such sharing, one or more instances (or copies) of the modular document can be provided to one or more users.

In accordance with some embodiments, access rights can be individually specified for each of at least some of the component documents of the modular document. The access rights can specify criteria under which the corresponding component documents can be accessed. For example, the criteria can specify that only certain users, users acting in a particular role, or categories of users (e.g., users with security level greater than some threshold, users belonging to a particular department or organization, etc.) can access (read and/or write to) the component document. Other criteria can be specified, such as a criterion relating to whether or not the user is located on the premises of an enterprise (e.g., company, educational organization, government agency, etc.). Another example criterion is whether or not the user has a proper license to access the component document. Other criteria can be employed in other examples.

In addition to providing individual access rights for at least some of the component documents of a modular document, these component documents are also associated with access mechanisms that specify actions to take when access to content of corresponding component documents is denied based on the access rights associated with the component documents. An access mechanism can be in the form of an alternative rendering definition that defines an alternative way of presenting a corresponding component document if the content of the component document is inaccessible when attempting to present the modular document. In an alternative embodiment, the access mechanism can be in the form of a conditional update mechanism that defines both the updates, if any, permitted by the user's access rights and how the component document is to be modified if the content of the component document is inaccessible when attempting to update the modular document.

The access rights and/or access mechanisms associated with the component documents can either be embedded in the component documents or alternatively, linked to the component documents (by embedding references in the component documents to the corresponding access rights and/or access mechanisms).

As discussed above, a modular document is made up of component documents. In alternative embodiments, each document (a modular document or a component document) can include parts. For example, the parts of a document can include a data part, a style part, an image part, and so forth. A document may be constructed from parts of another document. For example, one document may refer to and re-use just the style and image parts of another document. As a result, in these embodiments, a dependency reference can identify both a component document plus the part of the component document to be used in the construction. More generally, a "part" of a document refers to a portion less than the entirety of the document. One example type of a part of a document is a component document as discussed above.

The ensuing discussion primarily refers to access rights/access mechanisms associated with component documents—however, it is noted that the same or similar techniques are applicable to parts of modular documents.

FIG. 1A illustrates an example of a modular document 100, which is represented as a root document, that contains references 102, 104 to corresponding component documents 106, 108. Although just two references and corresponding two component documents are illustrated in FIG. 1A, it is noted that the modular document 100 can contain references to additional component documents.

As shown in FIG. 1A, each of the component documents 106, 108 is associated with a respective access right policy 110 or 112, respectively, and a respective access mechanism 114, 116. In FIG. 1, the access right policies 110, 112 and access mechanisms 114, 116 are shown as being embedded in corresponding component documents 106, 108. In an alternative implementation, the component documents 106, 108 can contain references that link to corresponding access right policies and access mechanisms that are provided outside the respective component documents.

Figure 1B:
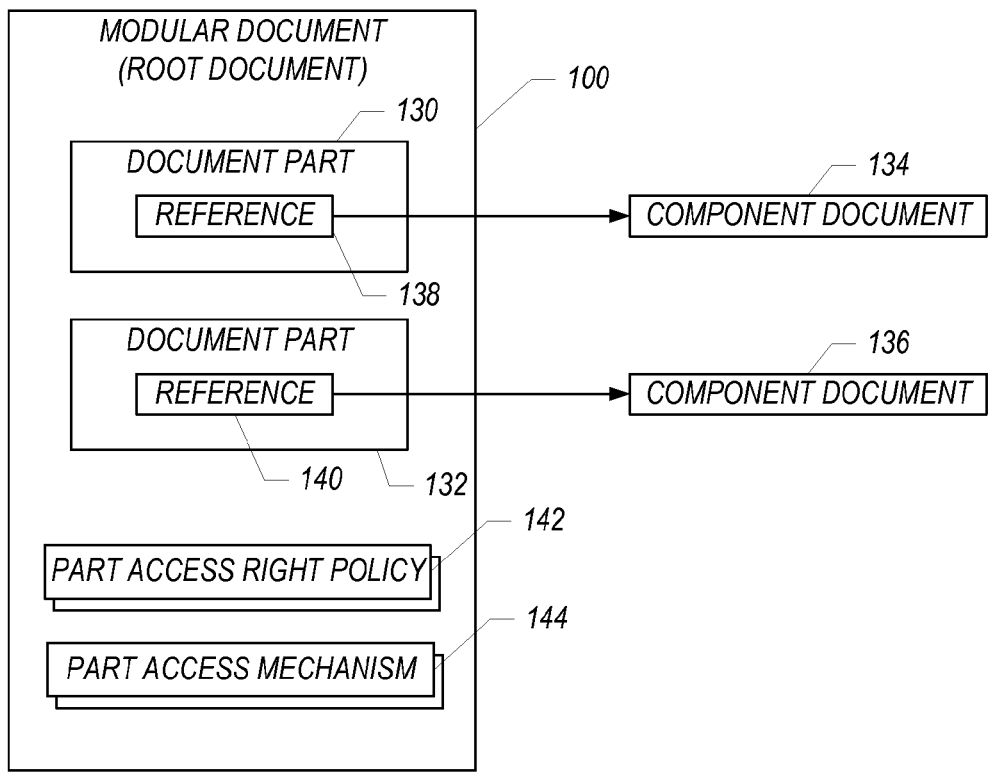
FIG. 1B is a schematic diagram of a modular document containing document parts that are associated with respective access rights and access mechanisms, according to another embodiment.

In embodiments where access right policies and access mechanisms are provided for parts of a document, such access right policies and access mechanisms can be within the document but outside of the parts. One example of such an embodiment is shown in FIG. 1B, which depicts the modular document 100 as containing parts 130 and 132. Each of the parts 130 and 132 includes a respective reference 138 and 140 to corresponding component documents 134 and 136. Part access right policies 142 and part access mechanisms 144 associated with the document parts 130 and 132 are contained within the modular document 100 but outside of the parts 130 and 132.

As shown in FIG. 1C, according to one embodiment, the access mechanism (114 or 116) can be in the form of an alternative rendering definition 150. For example, the alternative rendering definition 150 can be selected for presenting content of the corresponding component document 106 or 108 if the access right policy 110 or 112 specifies that a particular accessing entity (e.g., user or computer) does not have the right to access the component document. Note that the alternative rendering definition 150 is not used if the accessing entity does have the right to access the component document 106 or 108, based on the access right policy 110 or 112.

The alternative rendering definition 150 can be associated with a function 152 that applies an action for presenting the component document 106 or 108 when the rendering definition 150 is invoked. The action performed by the function 152 can be to select different content to present (such as a blank space or some other predefined content) to provide in place of the content of the component document that is inaccessible. As another example, the action can be to select a default document to use when a particular component document is inaccessible.

The function 152 can be an XML (Extensible Markup Language)-based function. In one example, each of the modular document 100 and component documents 106, 108 can be according to the XML format. The function 152 associated with alternate rendering definition 150 can be Extensible Stylesheet Language Transformations (XSLT), which is an XML-based language designed for performing transformations on XML content. In alternative embodiments, another type of the function 152 can be employed.

In an alternative embodiment, as shown in FIG. 1D, each access mechanism 114 or 116 in a component document 106 or 108 can be in the form of a conditional update program 160.

The conditional update program 160 can be associated with a policy 162 that specifies the condition(s) under which the content of the component document is to be modified. For example, if it is determined that the accessing entity does not have a right to access the content of a component document, then the policy 162 can specify that the conditional update program 160, using a corresponding method (software routine) can make a modification of the content of the component document 106, such as by creating a summary or a redacted version of the component document. The modified content can then be combined with other component documents for presentation of the overall modular document.

Moreover, where the user (or other accessing entity) has reduced access rights, the conditional update program 160 may perform a different type of update, such as by adding an annotation rather than updating the content. When updates are performed by users (or other accessing entities) with greater access rights, the conditional update program 160 can create a summary or redacted form of the updated content for use by the alternative rendering mechanism (discussed above in connection with FIG. 1C) when the document is accessed by a user (or other accessing entity) with reduced rights.

Although FIGS. 1C and 1D show the access right policy and access mechanism as being part of a component document, in an alternative embodiment, the access right policy and access mechanism can be associated with a document part, where such access right policy and access mechanism are outside of the document part but contained in the document containing the document part.

Figure 2:
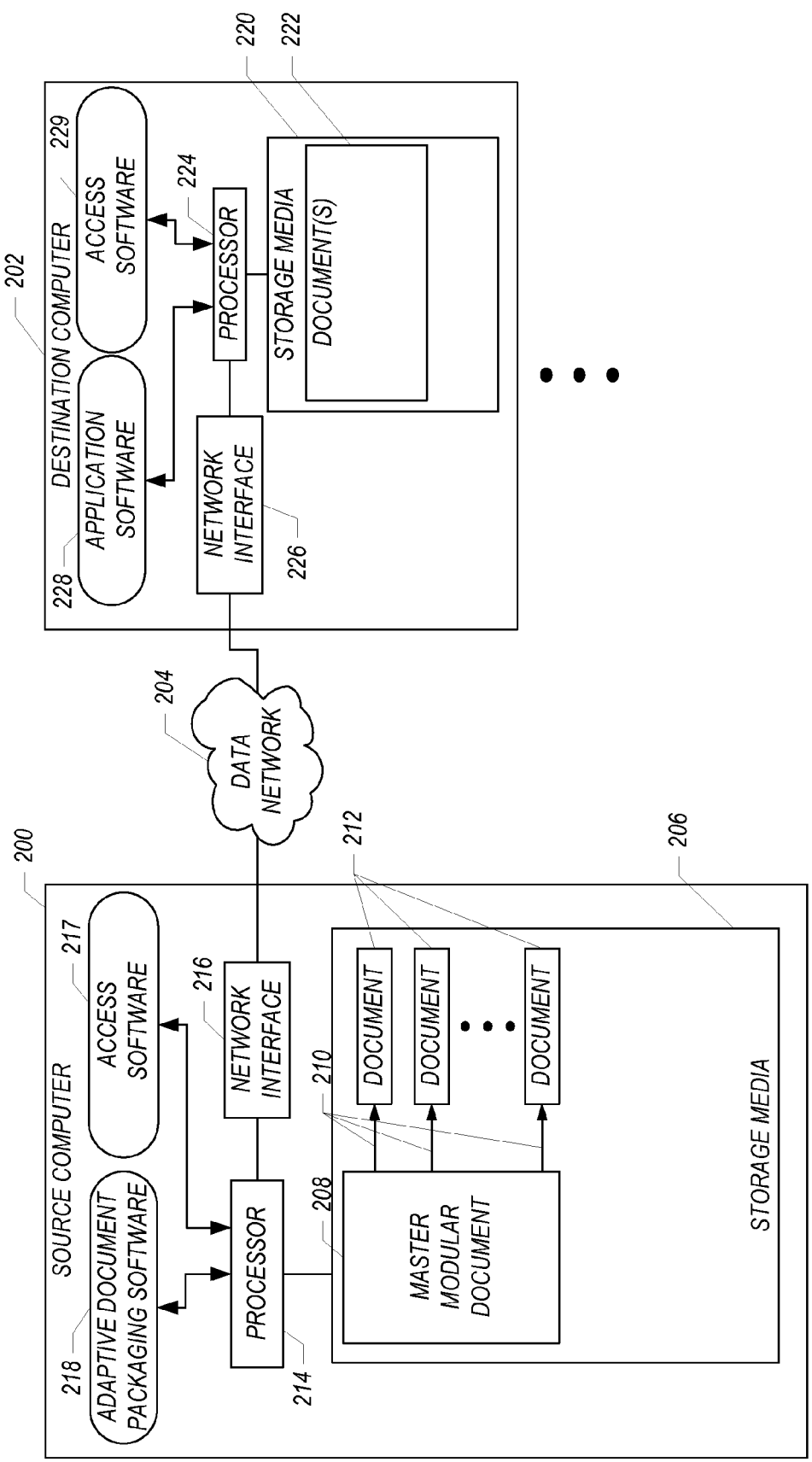
FIG. 2 is a block diagram of an exemplary arrangement that includes a source computer and a destination computer, in which an embodiment of the invention can be incorporated.

FIG. 2 is a block diagram of an exemplary arrangement that includes a source computer 200 (or other source electronic device) and one or more destination computers 202 (or other destination electronic devices) that are coupled over a data network 204 to the source computer 200. Examples of the data network 204 include any one or more of a local area network (LAN), a wide area network (WAN), the Internet, and so forth (whether wired or wireless). Examples of source and destination electronic devices include one or more of the following: desktop computers, notebook computers, server computers, personal digital assistants (PDAs), smart phones, gaming consoles, music/video players, or other types of electronic devices.

The source computer 200 includes storage media 206, which can be implemented with one or more disk-based storage devices and/or one or more integrated circuit (IC) or semiconductor memory devices. As shown in the example in FIG. 2, the storage media 206 contains a modular document 208 that references 210 multiple component documents 212. Although just one modular document 208 is shown, it is noted that the storage media 206 can contain more than one modular document.

It is also noted that in some applications, at least one of the component documents 212 can itself be a modular document that references other component documents. Thus, generally, a first modular document can reference component documents, where it is possible that at least one of the component documents is a second modular document that in turn references additional component documents. Moreover, it is also possible that at least one of the additional component documents is a third modular document that references further component documents. This hierarchical referencing of modular documents can be performed to any depth.

The source computer 200 further includes a processor 214 connected to the storage media 206. The processor 214 is connected to a network interface 216 that allows the source computer 200 to communicate over the data network 204 with the destination computers 202.

In addition, the source computer 100 includes an adaptive document packaging software 218 that is executable on the processor 214. The adaptive document packaging software 218 is able to perform adaptive packaging of component documents of a modular document that is to be transmitted from the source computer 200 to the destination computer 202. In accordance with some embodiments, the adaptive packaging refers to omitting component document(s) from a package that is sent to the destination computer 202. Component document(s) can be omitted from the package, for example, if the adaptive document packaging software 218 determines that the destination computer 202 does not have the ability to access the component document(s).

In addition, the source computer 200 includes a modular document access software 217 that manages access of a modular document. The modular document access software 217 is able to access the access right policy of each component document in the modular document to determine if access to content of the component documents is possible. If not, then the corresponding access mechanism(s) is accessed to determine an action to take in response to denying access of the corresponding component document(s).

As further shown in FIG. 2, the destination computer 202 includes a storage media 220 that contains one or more documents 222, which can be modular documents. The storage media 220 is connected to a processor 224, which is connected to a network interface 226 to allow the destination computer 202 to communicate over the data network 204. The destination computer 202 also includes application software 228 that is executable on the processor 224. The application software 228 can be a word processing software, a web browser, or any other software that is able to process and present modular documents.

The destination computer 202 further has a modular document access software 229 that is executable on the processor 224 to manage access of modular documents. The modular document access software 229 is able to perform access of access rights and access mechanisms of component documents.

Figure 3:
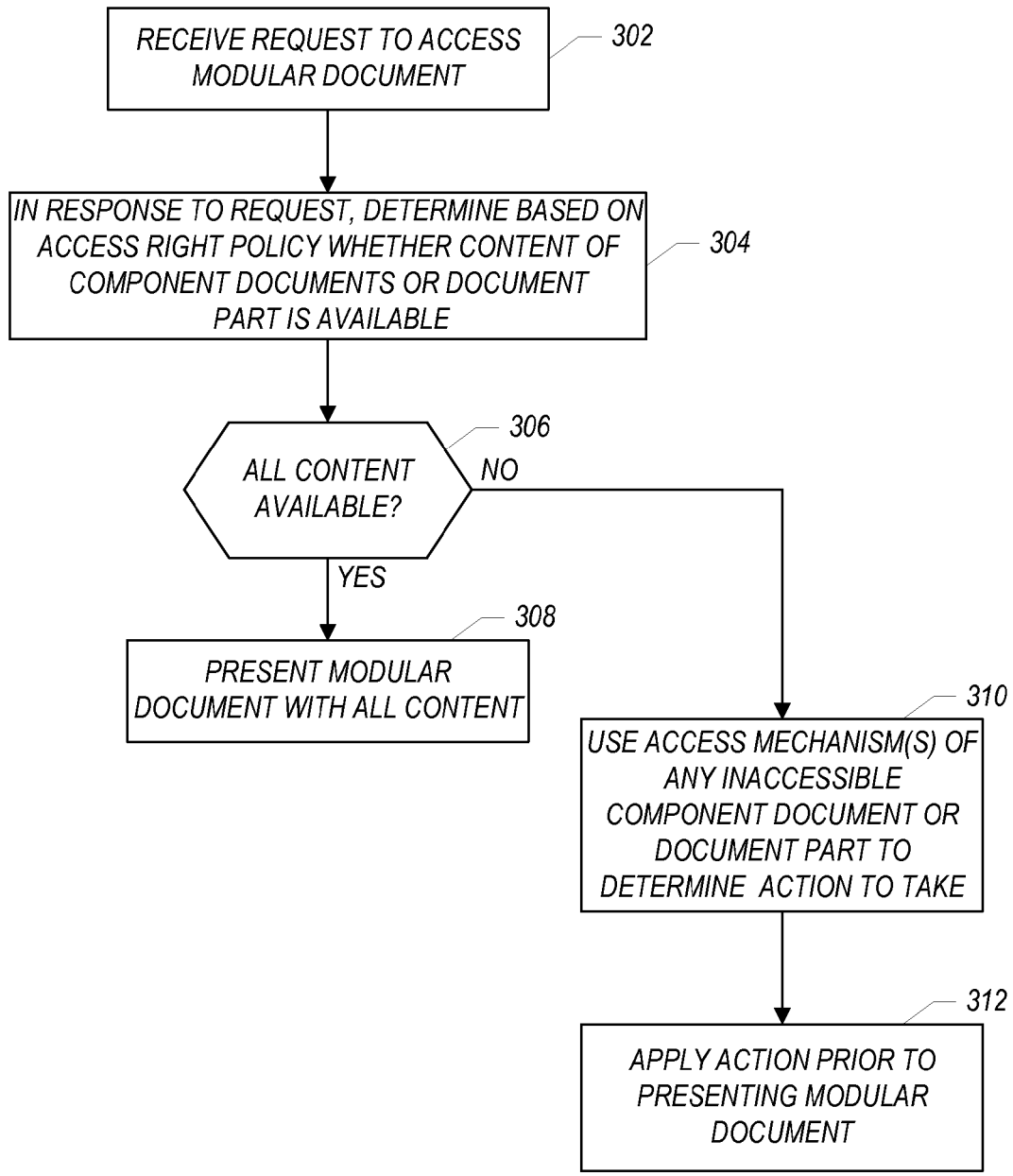
FIG. 3 is a flow diagram of a process of accessing a modular document having component documents or parts associated with respect access rights, in accordance with an embodiment.

FIG. 3 is a flow diagram of accessing a modular document. A request is received (at 302) from a requesting entity (e.g., user, application, or other entity) to access a modular document having component documents (or parts). One or more of the component documents (or parts) are associated with respective one or more access right policies.

In response to the request to access the modular document, the modular document access software 217 or 229 (FIG. 2) determines (at 304), based on the access right policy(ies) of the component document(s) or document part(s), whether the requesting entity is allowed to access the component document(s) or document part(s).

In response to determining (at 306) that the content of all component documents or document part(s) is available, then the modular document access software 217 or 229 presents (at 308) the modular document containing all relevant component documents or document part(s).

However, if it is determined (at 306) that the content of at least one component document is not available, the access mechanism associated with the at least one component document or document part is used (at 310) to determine an action to take with respect to the at least one component document or document part. The access mechanism can be an alternative rendering definition (e.g., 150 in FIG. 1B) or a conditional update program (e.g., 160 in FIG. 1C). The determined action is then applied (at 312) prior to presenting the modular document.

Figure 4:
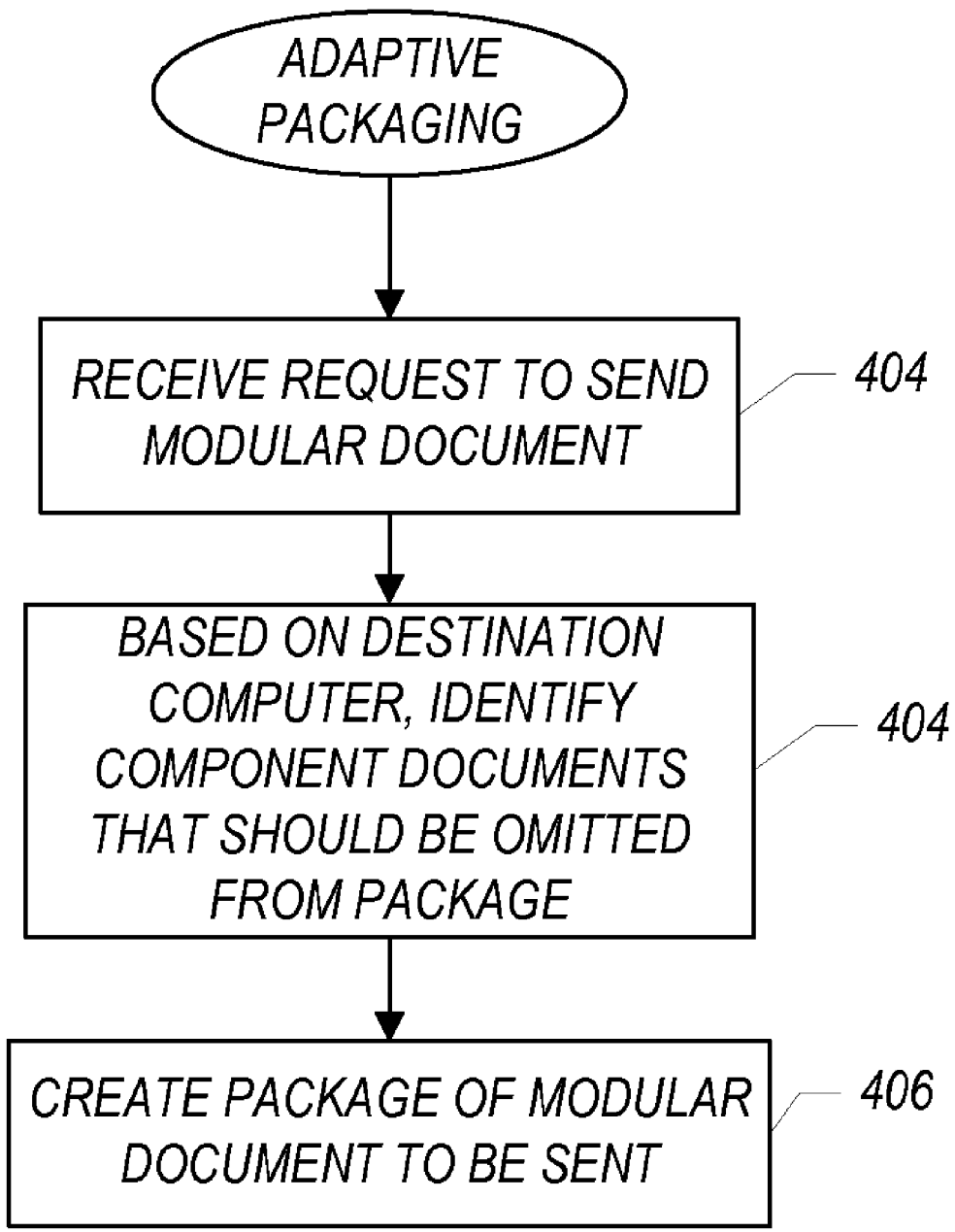
FIG. 4 is a flow diagram of a process of packaging a modular document and its component documents for transmission between computers, in accordance with an embodiment.

FIG. 4 is a flow diagram of a process of performing adaptive packaging according to an embodiment. At the source computer 200 (FIG. 2), a request is received (at 402) by the adaptive document packaging software 218 to send a modular document to a destination computer 202. The adaptive document packaging software 218 identifies (at 404) which of the component documents of the modular document should be omitted from a package of the modular document to be sent to the destination computer 202. In some embodiments, a component document can be omitted from a package sent to the destination computer 202 if the adaptive document packaging software 218 determines that the destination computer 202 would not have the ability to access the component document, based on the accessed right policy of the component document.

The component document can also be omitted from the package if the adaptive document packaging software 218 determines that the component document should not be known at the destination computer 202. Note that in addition to omitting component documents, any access policy or access mechanism that reveals that the restricted part exists can also be omitted.

The package is then created (at 406) that omits any component documents identified at 404. A policy of how any particular component document is to be provided in a package for the modular document can be associated with either the modular document or a particular component document. Such policy can be accessed by the adaptive document packaging software 218 when creating the package.

Using mechanisms according to some embodiments, fine grained control of access to component documents of a modular document can be achieved, while still making it possible for the modular document to be presented as a coherent output even when one or more component documents are not available. Also, when knowledge about access rights at the destination computer 202 is known, then such knowledge can be exploited to omit certain component document(s) from a package of a modular document sent from a source computer to a destination computer. This improves access control, as well as network efficiency by reducing the amount of data transmitted from the source computer 200 to the destination computer 202.

Instructions of software described above (including adaptive document packaging software 218, modular document access software 217, application software 228, and modular document access software 229 of FIG. 2) are loaded for execution on a processor (such as processor 114 or 124 in FIG. 2). The processor includes microprocessors, microcontrollers, processor modules or subsystems (including one or more microprocessors or microcontrollers), or other control or computing devices. As used here, a "processor" refers to hardware, software, or a combination thereof. A "processor" can refer to a single component or to plural components (e.g., one or plural CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
receiving, by an electronic device, a modular document that is composed of plural parts, wherein at least a particular one of the parts is associated with an access right policy that restricts access to the particular part;
in response to a request to access the modular document, determining based on the access right policy whether content of the particular part is accessible in the electronic device;
in response to determining that the content of the particular part is inaccessible in the electronic device, accessing an access mechanism associated with the particular part to determine an action to take with respect to the particular part when presenting the modular document; and
modifying the content of the particular part using the access mechanism, wherein the modifying is selected from among producing a summary of the content of the particular part and adding an annotation with respect to the particular part.

2. The method of claim 1, wherein accessing the mechanism comprises accessing an alternative rendering definition that defines an alternative way of presenting the particular part if the content of the particular part is inaccessible when attempting to present the modular document.

3. The method of claim 2, wherein the alternative rendering definition is associated with a function to perform the action.

4. The method of claim 2, wherein the alternative rendering definition is embedded in the particular part.

5. The method of claim 2, wherein the alternative rendering definition is linked to the particular part.

6. The method of claim 2, wherein the alternative rendering definition is outside the particular part but included in the modular document.

7. The method of claim 1, wherein accessing the access mechanism comprises accessing a conditional update program that defines how the particular part is to be modified if the content of the particular part is inaccessible when attempting to present the modular document.

8. The method of claim 7, further comprising:
executing the conditional update program to modify the content of the particular part; and
presenting the modular document with the modified content of the particular part.

9. The method of claim 1, further comprising:
presenting the modular document with the modified content of the particular part.

10. A method comprising:
receiving, by an electronic device, a modular document that is composed of plural parts, wherein at least a particular one of the parts is associated with an access right policy that restricts access to the particular part;
in response to a request to access the modular document, determining based on the access right policy whether content of the particular part is accessible in the electronic device;
in response to determining that the content of the particular part is inaccessible in the electronic device, accessing an access mechanism associated with the particular part to determine an action to take with respect to the particular part when presenting the modular document, wherein accessing the access mechanism comprises accessing a conditional update program that defines how the particular part is to be modified if the content of the particular part is inaccessible when attempting to present the modular document;
executing the conditional update program to modify the content of the particular part, wherein modifying the content of the particular part comprises producing a summary or a redacted version of the content of the particular part or adding an annotation with respect to the particular part; and
presenting the modular document with the modified content of the particular part.

11. The method of claim 10, wherein the conditional update program further defines any update permitted by a requesting entity's access rights.

12. The method of claim 10, wherein receiving the modular document that is composed of the plural parts comprises receiving the modular document that is composed of plural component documents that are to be combined to allow presentation of the modular document, wherein at least a particular one of the component documents is associated with the access right policy that restricts access to the particular component document.

13. An electronic device comprising:
a non-transitory storage media to store a modular document that is composed of plural parts; and
a processor to:
associate an access right policy with at least a particular one of the parts that defines one or more criteria under which content of the particular part is inaccessible; and
associate a conditional update program with the particular part that defines how the particular part is to be modified when presenting the modular document when the content of the particular part is inaccessible based on the access right policy;
execute the conditional update program to modify the content of the particular part, wherein modifying the content of the particular part comprises producing a summary or a redacted version of the content of the particular part or adding an annotation with respect to the particular part; and
present the modular document with the modified content of the particular part.

14. The electronic device of claim 13, wherein the processor is configured to further:
determine whether a destination electronic device to which the modular document is to be sent is able to satisfy the access right policy of the particular part; and
in response to determining that the destination electronic device is unable to satisfy the access right policy of the particular part, omit the particular part from a package containing the modular document that is sent to the destination electronic device.

15. The electronic device of claim 13, wherein a policy of how the particular part is to be provided in a package for the modular document is associated with either the modular document or particular part.

16. An article comprising at least one non-transitory computer-readable storage medium containing instructions that upon execution cause an electronic device to:
receive a modular document that is composed of plural component documents that are to be combined to allow presentation of the modular document, wherein at least a particular one of the component documents is associated with an access right policy that restricts access to the particular component document;
in response to a request to access the modular document, determine based on the access right policy whether content of the particular component document is accessible in the electronic device;
in response to determining that the content of the particular component document is inaccessible in the electronic device, access an access mechanism associated with the particular component document to determine an action to take with respect to the particular component document when presenting the modular document; and
modify content of the particular component document using the access mechanism, wherein the modifying is selected from among producing a summary of the content of the particular component document and adding an annotation with respect to the particular component document.

17. The article of claim 16, wherein the access mechanism comprises a conditional update program that defines how the particular component document is to be modified if the content of the particular modular document is inaccessible when attempting to present the modular document.

18. The article of claim 16, wherein the instructions upon execution cause the electronic device to further present the modular document with the modified content of the particular modular document.

* * * * *